United States Patent
Kazui et al.

(10) Patent No.: US 8,606,024 B2
(45) Date of Patent: Dec. 10, 2013

(54) COMPRESSION-CODING DEVICE AND DECOMPRESSION-DECODING DEVICE

(75) Inventors: Kimihiko Kazui, Kawasaki (JP); Kohji Yamada, Kawasaki (JP); Takashi Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 770 days.

(21) Appl. No.: 11/774,328

(22) Filed: Jul. 6, 2007

(65) Prior Publication Data

US 2007/0258652 A1 Nov. 8, 2007

Related U.S. Application Data

(63) Continuation of application No. PCT/JP2005/000123, filed on Jan. 7, 2005.

(51) Int. Cl.
 *G06K 9/36* (2006.01)
 *G06K 9/46* (2006.01)

(52) U.S. Cl.
 USPC .......................................................... 382/233

(58) Field of Classification Search
 USPC ............. 382/232, 233, 234, 236; 375/240.16, 375/240.25
 See application file for complete search history.

(56) References Cited

U.S. PATENT DOCUMENTS

| | | | | |
|---|---|---|---|---|
| 6,055,274 A | * | 4/2000 | McVeigh | 375/240.16 |
| 6,137,912 A | | 10/2000 | Kostrzewski et al. | 382/236 |
| 6,441,844 B1 | | 8/2002 | Tatsuzawa | 348/42 |
| 6,757,441 B1 | | 6/2004 | Katayama et al. | 382/248 |
| 7,433,525 B2 | * | 10/2008 | Kim | 382/233 |
| 2002/0009137 A1 | * | 1/2002 | Nelson et al. | 375/240.1 |
| 2003/0190079 A1 | * | 10/2003 | Penain et al. | 382/238 |

FOREIGN PATENT DOCUMENTS

| | | |
|---|---|---|
| JP | 06-098312 | 4/1994 |
| JP | 06-113338 | 4/1994 |
| JP | 07-143494 | 6/1995 |
| JP | 9-261653 | 10/1997 |
| JP | 09-261653 | 10/1997 |
| JP | 10-191394 | 7/1998 |
| JP | 11-069381 | 3/1999 |
| JP | 2000-023918 | 1/2000 |
| JP | 2001-186516 | 7/2001 |
| JP | 2002-016945 | 1/2002 |
| JP | 2002-523943 | 7/2002 |
| JP | 2002-300607 | 10/2002 |
| JP | 3426668 | 5/2003 |

OTHER PUBLICATIONS

Kimata, H. et al., *System Design of Free Viewpoint Video Communication*, Proceedings of the Fourth International Conference on Computer and Information Technology, IEEE, 2004, pp. 52-59.

(Continued)

*Primary Examiner* — Phuoc Tran
(74) *Attorney, Agent, or Firm* — Staas & Halsey LLP

(57) ABSTRACT

There are provided a device and a method capable of increasing the processing speed and preventing the increase of the device size by eliminating decompression/decoding processing not required for decompression/decoding of a moving picture of a point-of-view desired by a user. The decompression/decoding device includes: instruction input means for receiving an instruction for a frame to be outputted; judgment means for reading out motion prediction information from the moving picture data and judging the frame used for motion prediction in compression/encoding of the frame to be outputted; and decompression/decoding means for decompressing/decoding only the frame judged by the judgment means and the frame to be outputted.

6 Claims, 10 Drawing Sheets

(56) References Cited

OTHER PUBLICATIONS

Li, G. et al., *A Novel Multi-View Video Coding Scheme Based on H.264*, Information, Communications and Signal Processing, vol. 1, Dec. 2003, pp. 493-497.

Aydnoglu, H. et al., *Compression of Multi-View Images*, IEEE Comp. Soc. Press, vol. 2, Nov. 13, 1994, pp. 385-389.

Guo, X. et al., Multiview Coding Based on Global Motion Model, Proceedings of the 5$^{th}$ Pacific Rim Conference on Multimedia, vol. 3333, pp. 665-672.

Kimata, H. et al., Hierarchical Reference Picture Selection Method for Temporal Scalability beyond H.264, 2004 IEEE International Conference on Multimedia and Expo, vol. 1, Jun. 27, 2004, pp. 181-184.

European Search Report dated Feb. 5, 2010 and issued in corresponding European Patent Application 05703388.8.

International Search Report in corresponding PCT Application No. PCT/JP2005/000123 (2 pp).

U.S. Appl. No. 11/774,264, filed Jul. 6, 2007, Kazui et al., Fujitsu Limited.

International Preliminary Report on Patentability issued Jul. 10, 2007 in PCT Application No. PCT/JP2005/000122 (6 pages).

International Preliminary Report on Patentability issued Jul. 10, 2007 in corresponding PCT Application No. PCT/JP2005/000123 (5 pages).

Japanese Office Action issued Nov. 24, 2010 in corresponding Japanese Patent Application 2006-550569.

Caspi, Y. et al., *A Step Towards Sequence-to-Sequence Alignment*, Proceedings IEEE Conference on Computer Vision and Pattern Recognition, vol. 2, Jun. 13-15, 2000, pp. 682-689.

Khan, S. et al., *Consistent Labeling of Tracked Objects in Multiple Cameras with Overlapping Field of View*, IEEE Transactions on Pattern Analysis and Machine Intelligence, vol. 25, No. 10, Oct. 2003, pp. 1355-1360.

Lim, J. et al., *A multiview sequence CODEC with view scalability*, Signal Processing: Image Communication, vol. 19, 2004, pp. 239-256.

Supplementary European Search Report, mailed Jun. 14, 2010, in corresponding European Application 05703387.0.

Japanese Office Action issued Apr. 2, 2013 for corresponding Japanese Application No. 2011-012168.

Japanese Office Action issued Apr. 2, 2013 for corresponding Japanese Application No. 2011-037440.

Japanese Office Action issued Apr. 2, 2013 for corresponding Japanese Application No. 2011-037441.

Notice of Reason for Rejection mailed Dec. 11, 2012 in corresponding Japanese Patent Application No. 2011-012168.

Japanese Office Action issued Dec. 11, 2012 for corresponding Japanese Application No. 2011-037440.

Japanese Office Action issued Dec. 11, 2012 for corresponding Japanese Application No. 2011-012168.

Japanese Office Action issued Dec. 11, 2012 for corresponding Japanese Application No. 2011-037441.

Summons to attend oral proceedings dated Jul. 23, 2013 issued in the corresponding EP application No. 05703388.8.

"Unconstrained Free-Viewpoint Video Coding", 2004 International Conference on Image Processing, IEEE, vol. 5, Oct. 24, 2004, pp. 3261-3264, XP010786493.

\* cited by examiner

*FIG. 6*

| CAMERA<br>CROSSWISE<br>PANNING | C(1) | C(2) | C(3) | C(4) | C(5) | C(6) | C(7) |
|---|---|---|---|---|---|---|---|
| NO PANNING | C(2) | ○ | C(4) | ○ | C(4) | ○ | C(6) |
| LEFT | ○ | C(1) | ○ | C(3) | ○ | C(5) | ○ |
| RIGHT | ○ | C(3) | ○ | C(5) | ○ | C(7) | ○ |

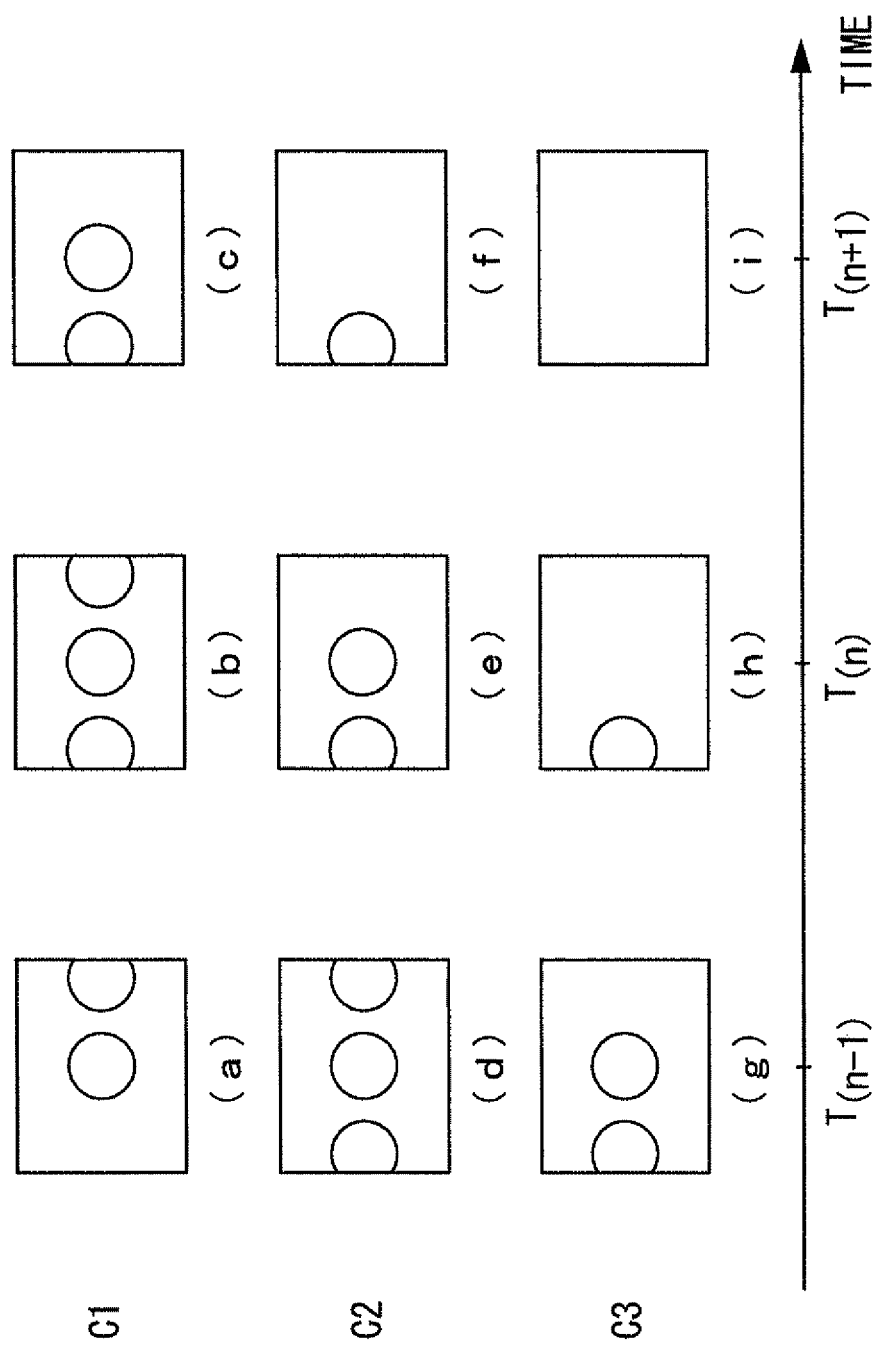

COMPRESSION-CODING DEVICE AND DECOMPRESSION-DECODING DEVICE

CROSS-REFERENCE TO RELATED APPLICATION

This is a continuation of Application PCT/JP2005/000123, filed on Jan. 7, 2005, now pending, the contents of which are herein wholly incorporated by reference.

BACKGROUND OF THE INVENTION

1. Field of the Invention

The present invention relates to a technology effective in being applied to a device and a method of coding and decoding an image captured at multi-points of view.

2. Description of the Related Art

Over the recent years, a technology of utilizing a dynamic image (moving picture) captured simultaneously at multi-points of view has been focused. What has been impossible to a conventional stereo-camera system is made possible by utilizing this type of dynamic image. For example, a user is enabled to watch a camera dynamic image at the multi-points of view without using a stereoscopic display. To be specific, a scene of a concert is imaged simultaneously at the multi-points of view, whereby the user is enabled to watch a situation of the concert not from a single viewpoint but from arbitrary viewpoints such as in a crosswise direction and a rear direction.

By the way, generally, a data size of the dynamic image (moving picture) is extremely large. Therefore, it is disadvantageous in terms of a transmission speed and a cost to accumulate media data and transmit the data via a network without compressing the dynamic image data. Hence, such technologies have been developed that the dynamic image is compression-coded by a reversible or irreversible method. These technologies are exemplified such as MPEG-1, MPEG-2 and MPEG-4 standardized by Moving Picture Experts Group (MPEG).

The number of dynamic images, however, increases with a rise in the number of multi-points of view at which to capture the images simultaneously (a rise in the number of cameras). Therefore, a total data size of the dynamic images captured simultaneously at the multi-points of view rises as compared with the data size of the dynamic images captured by use of the single camera. Hence, a demanded technology is a technology of efficiently compression-coding the data of dynamic images captured simultaneously at multi-points of view.

A technology of improving prediction efficiency by use of correlativity between the dynamic images captured at the multi-points of view is proposed to cope with such a problem. In this type of technology, the coding efficiency is improved as the prediction efficiency is improved. The correlativity between the dynamic images captured at the respective viewpoints implies that an object and a background projected on a camera at a certain viewpoint are also partly projected on a camera at another viewpoint. For example, when a frame on the camera at a certain viewpoint is compared with a frame captured at the same time on the camera at another viewpoint and if the two cameras capture the image in near positions and in near directions, there might be a case where the same object and the same background are imaged. Therefore, the frames captured at the same time by the different cameras are deemed as the frames captured by the same camera, whereby the predictive coding employing the motion vector can be performed. For instance, the coding efficiency can be made higher in the case of motion-prediction-coding the frame of the latter camera by employing further the frame of another camera (the former camera) than in the case of motion-prediction-coding the frame by use of only the frame captured by the same camera (the latter camera) as done so far. In this case, the motion vector is equivalent to a parallax between the two cameras. This type of technology is exemplified by Patent documents 1-7.

Patent document 1: Japanese Patent Application Laid-Open Publication No.2001-186516
Patent document 2: Japanese Unexamined Patent Publication No.2002-523943
Patent document 3: Japanese Patent Application Laid-Open Publication No.2002-300607
Patent document 4: Japanese Patent Publication No.3426668
Patent document 5: Japanese Patent Application Laid-Open Publication No.06-98312
Patent document 6: Japanese Patent Application Laid-Open Publication No.10-191394
Patent document 7: Japanese Patent Application Laid-Open Publication No.2000-23918

SUMMARY OF THE INVENTION

In the dynamic image data generated by the technology described above, one set of dynamic image data contains the dynamic images at the multi-points of view. Hence, in the case of executing decompression-decoding by a conventional decompression-decoding technology, in addition to the dynamic images at viewpoints desired by a user, dynamic image data at all other viewpoints, which is included in the former dynamic image data is decompression-decoded. Hence, the unnecessary processes involve expending a throughout capacity and a period of processing time, resulting in a problem such as a delay of processing.

Such being the case, it is an object of the present invention, which solves these problems, to provide a device and a method capable of actualization of speeding up the processing and of preventing the device to be upsized by executing none of unnecessary decompression-decoding process in order to decompression-decode the dynamic images at the viewpoints desired by the user.

Means for Solving the Problems

The present invention adopts the following configurations in order to solve the problems. According to a first mode of the present invention, a decompression-decoding device for decompression-decoding dynamic image data generated by a compression-coding device comprises instruction input means, determining means and decompression-decoding means. It should be noted that the compression-coding device compression-coding respective frames captured by a plurality of cameras, comprises: compression-coding means compression-coding the frames captured by a certain camera on the basis of motion prediction using the frames captured by the camera and the motion prediction using frames captured by another camera; motion predictive information generating means generating predictive information for making each frame corresponding to the frame used for the motion prediction which is captured by another camera; and synthesizing means generating one set of dynamic image data containing the plurality of post-compression-coding frames and the motion predictive information.

The instruction input means receives the instruction about the should-be-output frames. The "instruction about the should-be-output frames" may be an instruction received from another information processing device and may also be an instruction received from a user with respect to the frames desired to be displayed.

The determining means reads the motion predictive information from the dynamic image data, and determines the frames used for the motion prediction in compression-coding the should-be-output frames.

The decompression-decoding means executes the decompression-decoding with respect to only the frames determined by the determining means and the should-be-output frames. This configuration eliminates the execution of the decompression-decoding about the frames other than the should-be-output frames and the frames needed for decompression-decoding these should-be-output frames (which are, i.e., the frames used for the motion prediction when the should-be-output frames are compression-coded). Hence, the decompression-decoding process unnecessary for decompression-decoding the dynamic images at the viewpoints desired by the user, is not executed. It is therefore feasible to actualize the speedup of the processing and the prevention of upsizing the device.

The motion predictive information generating means of the compression-coding device for generating the dynamic image data at which the processing by the decompression-decoding device is targeted in the first mode of the present invention, may operate so as to contain, in the motion predictive information, information of time when each of the frames is compression-coded without implementing the motion prediction using the frames captured by another camera. In this case, the determining means in the first mode of the present invention, when determining the frames used for the motion prediction in compression-coding the should-be-output frames, may be configured to determine the camera deemed to capture the frames used for the motion prediction in compression-coding the should-be-output frames, and to determine, as the frames used for the motion prediction, the frames excluding the frames corresponding to the information of the time when the should-be-output frames are compression-coded without implementing the motion prediction in the frames captured by the camera.

In the case of determining whether or not the frames needed for decompression-decoding the should-be-output frames should be decompression-coded on a camera-by-camera basis, there is a case in which the futile decompression-decoding is to be executed. Specifically, as described above, there is a case where there exist the frames corresponding to the information of the time when the should-be-output frames are compression-coded without implementing the motion prediction, and these frames are not used for the motion prediction of the should-be-output frames and do not therefore need compression-decoding. Accordingly, when determining whether the decompression-decoding on the camera-by-camera basis is required or not, it follows that these frames are decompression-coded, resulting in occurrence of the futile process. On the other hand, according to the present invention having the configuration described above, it is also determined whether or not the respective frames captured by the same camera are the frames needed for the motion prediction of the should-be-output frames. Hence, the determination can be done more strictly than determining whether to be the frames that need decompression-decoding, and it is possible to actualize the speedup of the processing and the prevention of upsizing the device.

According to a second mode of the present invention, a compression-coding device for compression-coding respective frames captured by a plurality of cameras, comprises: compression-coding means, motion predictive information generating means and synthesizing means. The compression-coding means compression-codes the frames captured by a certain camera on the basis of motion prediction using the frames captured by the camera and the motion prediction using frames captured by another camera. The motion predictive information generating means generates predictive information for making each frame corresponding to the frame used for the motion prediction which is captured by another camera. Then, the synthesizing means generates one set of dynamic image data containing the plurality of post-compression-coding frames and the motion predictive information. Thus, the dynamic image data generated according to the second mode of the present invention having the configuration described above is decompression-decoded according to the first mode of the present invention.

The first mode and the second mode may be actualized by executing a program with an information processing device. Namely, the present invention can be specified as a program for making the information processing device execute processes executed by the respective means in the first mode and the second mode, and also specified as a recoding medium recorded with the program. Further, the present invention may also be specified as a method by which the information processing device executes the processes executed by the respective means.

Effects of the Invention

According to the present invention, it is feasible to actualize the speedup of the processing and the prevention of upsizing the device on the occasion of decompression-decoding the dynamic image data containing the dynamic images at the multi-points of view.

BRIEF DESCRIPTION OF THE DRAWINGS

FIG. 6 is a table showing whether each camera becomes the base camera or not and showing, in the case of the reference camera, which base camera a reference destination frame corresponds to.

FIG. 10 is a diagram illustrating a problem of the prior art.

Figure 1:
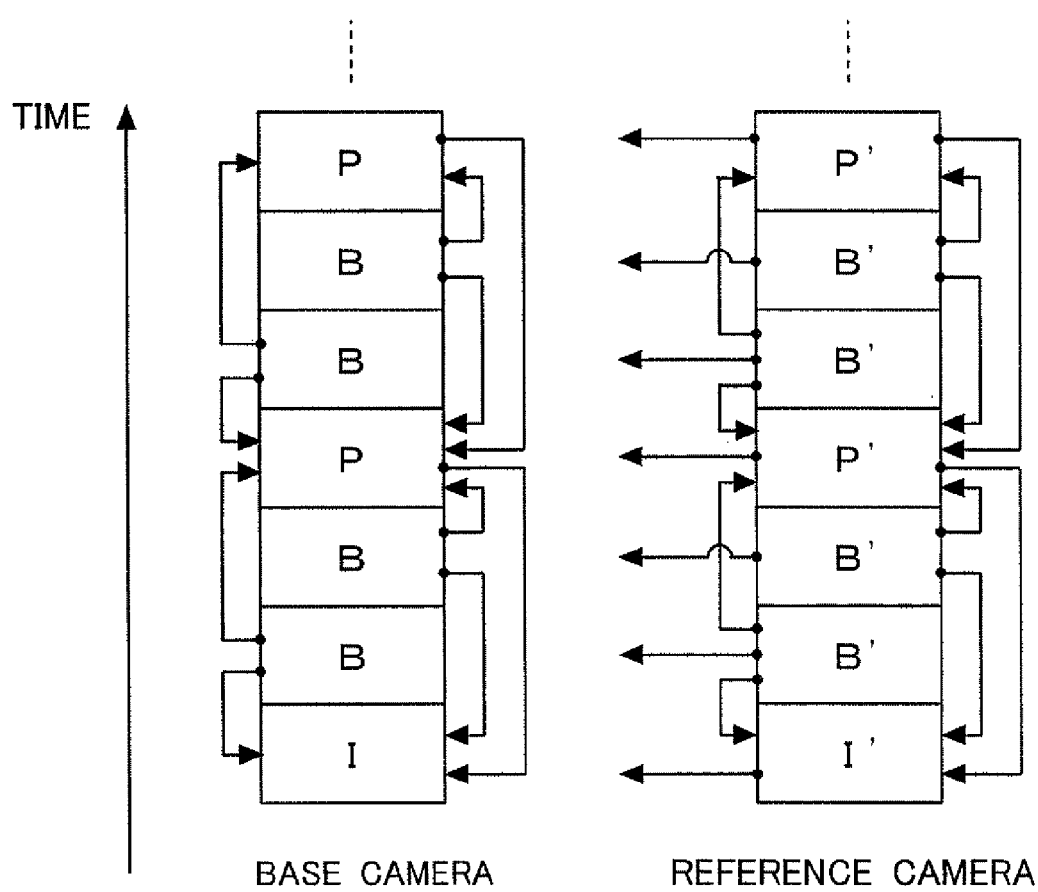
FIG. 1 is a diagram showing a prediction coding method for respective frames captured by a base camera, and the prediction coding method for the respective frames captured by a reference camera.

DESCRIPTION OF THE REFERENCE NUMERALS 1 compression-coding device
101 input frame buffer
102 subtracter
103 DCT quantization unit 104 IDCT inverse quantization unit
105 adder
106 frame buffer
107 motion/parallax vector correcting unit
108 variable length coding unit
109 header attaching unit
110 control unit
2 decompression-decoding device
201 header analyzing unit
202 coded dynamic image buffer
203 variable length decoding unit
204 IDCT inverse quantization unit
205 adder
206 display dynamic image buffer
207 frame buffer
208 motion/parallax vector correcting unit
209 control unit

DETAILED DESCRIPTION OF THE INVENTION

[Principle]

To start with, a principle of a predictive coding method according to the present invention will be described. FIG. 1 is a diagram showing the predictive coding method for respective frames captured by a base camera, and the predictive coding method for respective frames captured by a reference camera. In FIG. 1, the frames disposed at roots of arrowhead lines are subjected to predictive-coding in a way that refers to the frames disposed in positions indicated by the arrowheads.

An I-frame represents a frame undergoing Intraframe coding. The I-frame is coded without referring to none of other frames. A P-frame represents a frame a time anterior Predictive coding frame. The P-frame is the frame captured by the same camera and undergoes the predictive coding by referring to the I-frame positioned just anterior in time thereto or another P-frame. The predictive coding conducted by referring to other frames captured by the same camera will hereinafter be called [motion predictive coding]. A B-frame represents a time bidirectional predictive coding frame. The B-frame is the frame captured by the same camera and is subjected to the predictive coding by referring to the I-frame or the P-frame positioned just anterior in time thereto and referring to the I-frame or the P-frame positioned just posterior in time thereto. Concepts of the I-frame, the P-frame and the B-frame are the same as defined by MPEG-1, MPEG-2 and MPEG-4.

An I'-frame is predictively coded by referring to only the I-frame captured at the same time by the base camera. Thus, the predictive coding performed by referring to the frames captured by another camera will hereinafter be referred to as [parallax predictive coding]. A P'-frame undergoes the predictive coding by referring to the P-frame captured at the same time by the base camera and the I'-frame captured by the same camera and positioned just anterior in time thereto or other P'-frames. A B'-frame is subjected to the predictive coding by referring to the B-frame captured at the same time by the base camera, the I'-frame or the P'-frame captured by the same camera and positioned just anterior in time thereto, and the I'-frame or the P'-frame captured by the same camera and positioned just posterior in time thereto.

Figure 2:
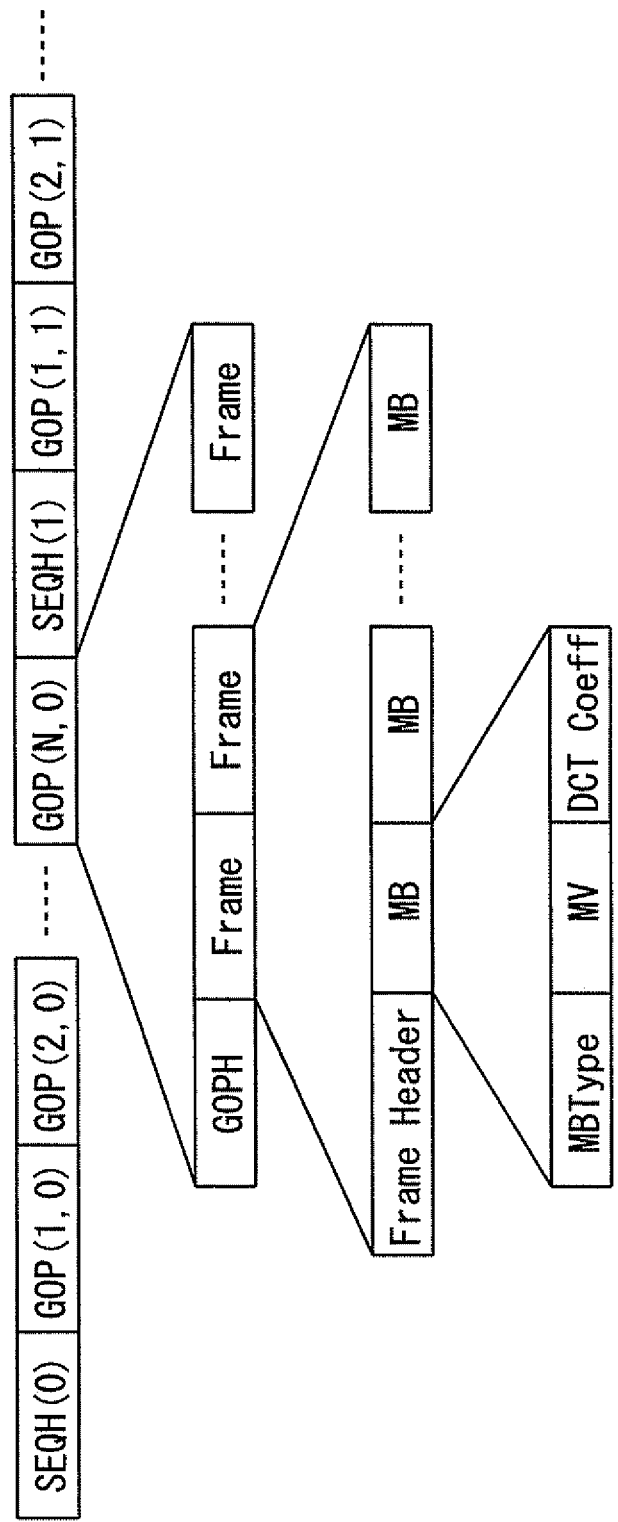
FIG. 2 is a diagram showing an example of a structure of dynamic image data.

A structure of the dynamic image data generated by the predictive coding according to the present invention will be described. FIG. 2 is a diagram showing an example of the structure of the dynamic image data. The dynamic image data contains SEQH and GOP. The SEQH is inserted on an all-camera basis of the GOP (Group Of Pictures). SEQH (n) represents that the subsequent GOP is an n-th GOP. The SEQH contains a total number of cameras, a parallax prediction type of each camera (i.e., the camera capturing each frame is any one of the base camera and the reference camera) and an identifier that identifies a reference target camera in the respective reference cameras. The GOP is data about the frames that are arranged along a time-base and organized into a group. "GOP(m, n)" represents the n-th GOP of a camera "m".

One GOP contains GOPH (GOP Header) and a plurality of Frames. The GOPH is defined as header information of the GOP. The GOPH contains an identifier that identifies the camera capturing the frame and time information (a relative value of a frame number from the head of the GOP) of a period during which the parallax prediction is not conducted. The Frame is data of the coded frame.

One Frame contains a Frame Header and a plurality of MBs (Macro Blocks). The Frame Header is header information of the frame. The Frame Header contains frame prediction types (I, P, B, I', P', B'). The MB represents macro block information.

Each MB contains MBType, MV and DCTCoeff. The MBType contains prediction types (Intra, Inter, Bi-Direction) and a quantization coefficient. The prediction type further contains an identifier of the frame that is referred to by unidirectional prediction (Inter) and bidirectional prediction (Bi-Direction) The prediction type contains one identifier in the case of the unidirectional prediction and two identifiers in the case of the bidirectional prediction. The MV is vector information. The vector information will hereinafter be described in a way of being categorized into a motion vector and a parallax vector in distinction. The motion vector represents vector information between the frames captured by the same camera, and the parallax vector stands for vector information between the frames captured by the different cameras. The DCTCoeff is quantized DCT (Discrete Cosine Transform) coefficient information of a prediction error.

Given next is an explanation of a compression-coding device 1 that generates the dynamic image data by compression-coding the dynamic images captured by the respective cameras and a decompression-decoding device 2 that decodes the dynamic image data generated by the compression-coding device 1.

[Compression-Coding Device]

The explanation begins with an example of a configuration of the compression-coding device 1. The compression-coding device 1 includes, as hardware components, a CPU (Central Processing Unit), a main storage device (Random Access Memory: RAM) and an auxiliary storage device, which are connected to each other via a bus. The auxiliary storage device is constructed by employing a nonvolatile memory. The nonvolatile memory connoted herein indicates a so-called ROM (Read-Only Memory) (including an EPROM (Erasable Programmable Read-Only Memory), an EEPROM (Electrically Erasable Programmable Read-Only Memory), mask ROM, etc), an FRAM (Ferroelectric RAM), a hard disk and so on.

Figure 3:
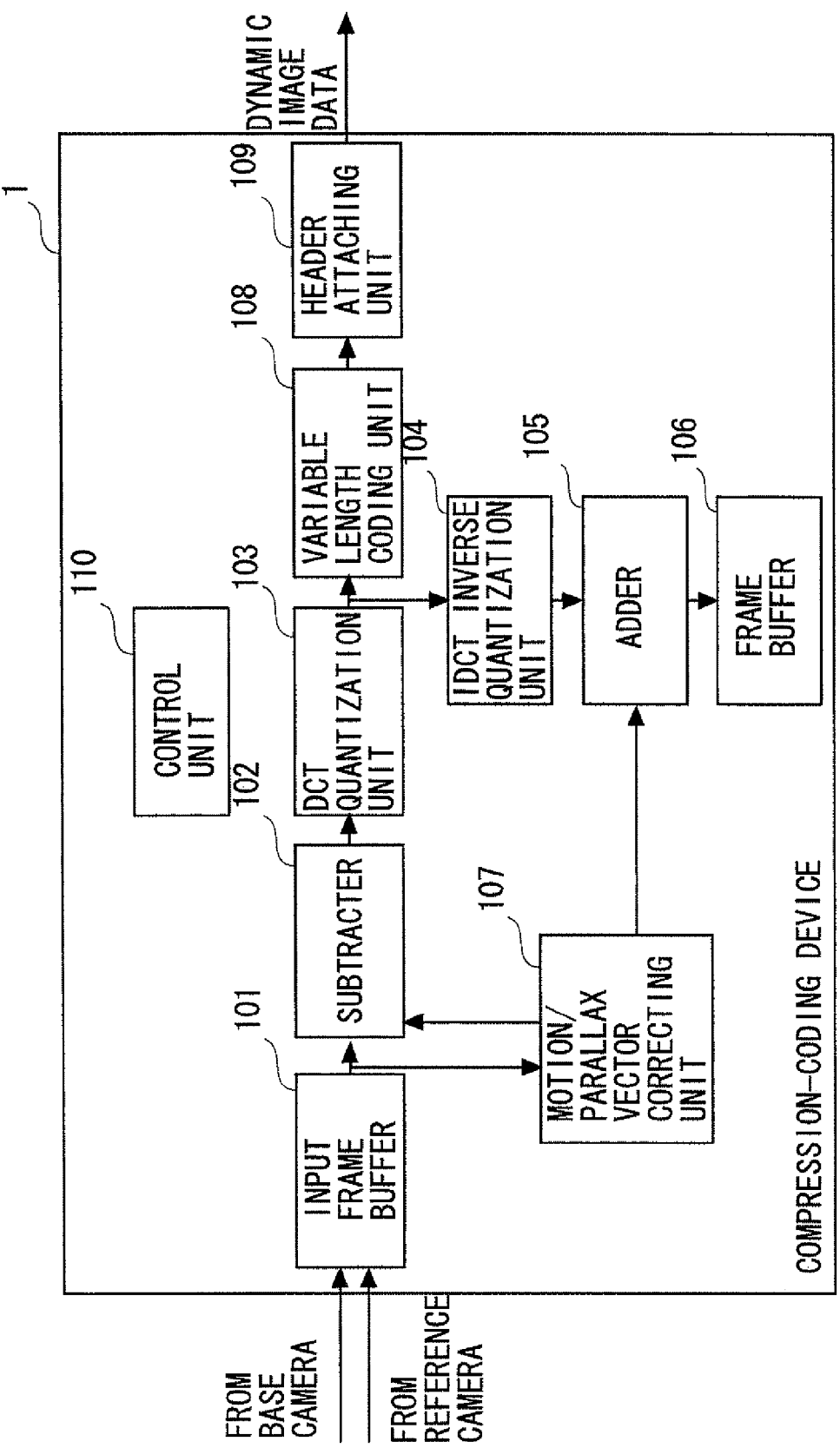
FIG. 3 is a diagram showing an example of functional blocks of a compression-coding device.

FIG. 3 is a diagram showing an example of functional blocks of the compression-coding device 1. The compression-coding device 1 functions, when a variety of programs (OS, applications, etc) stored in the auxiliary storage device are loaded into the main storage device and are executed by the CPU, as a device including an input frame buffer 101, a subtracter 102, a DCT quantization unit 103, an IDCT (InverseDCT) inverse quantization unit 104, an adder 105, a frame buffer 106, a motion/parallax vector correcting unit 107, a variable length coding unit 108, a header attaching unit 109 and a control unit 110. The DCT quantization unit 103, the IDCT inverse quantization unit 104, the motion/parallax vector correcting unit 107, the variable length coding unit 108, the header attaching unit 109 and the control unit 110 are actualized by executing the programs with the CPU. Further, the DCT quantization unit 103, the IDCT inverse quantization unit 104, the motion/parallax vector correcting unit 107, the variable length coding unit 108, the header attaching unit 109 and the control unit 110 may also be configured as dedicated chips. Next, the respective functional units included in the compression-coding device 1 will be described.

<Input Frame Buffer>

The input frame buffer 101 implements buffering on the dynamic image inputted to the compression-coding device 1. The dynamic image captured by the base camera and the dynamic image captured by the reference camera are inputted to the compression-coding device 1. Accordingly, the input frame buffer 101 implements buffering on the dynamic image captured by the base camera and on the dynamic image captured by the reference camera. The input frame buffer 101 outputs, according to an instruction given from the control unit 110, the frame data on a coding process basis of each camera. The "coding process basis" may embrace a 1-frame basis and also a plural-frame basis such as 1 GOP (Group Of Pictures). The frame output by the input frame buffer 101, which is, i.e., the compression-coding process target frame, will hereinafter be called an input frame.

<Subtracter>

The subtracter 102 calculates a difference between the input frame and the predictive information based on motion compensation and parallax compensation, and outputs a result of this calculation as prediction difference information.

<DCT Quantization Unit>

The DCT quantization unit 103 performs a DCT (Discrete cosine Transform) operation and a quantizing operation. The DCT quantization unit 103 implements the DCT operation about predictive difference information calculated by the subtracter 102 on a block basis, quantizes a DCT coefficient and outputs a quantized DCT coefficient as a result of this quantization.

<IDCT Inverse Quantization Unit>

The IDCT inverse quantization unit 104 conducts an IDCT (Inverse Discrete Cosine Transform) operation (which will hereinafter be termed also an [inverse DCT operation]) and an inverse quantizing operation. The IDCT inverse quantization unit 104 acquires a result of the inverse DCT operation by performing the inverse quantization of the quantized DCT coefficient and the inverse DCT operation.

<Adder>

The adder 105 generates a locally decoded dynamic image by adding up the result of the inverse DCT operation and a result of the prediction based on the motion compensation and the parallax compensation.

<Frame Buffer>

The frame buffer 106 accumulates the locally decoded dynamic images. Further, the frame buffer 106 outputs a designated frame of a designated camera dynamic image according to the instruction given from the control unit 110. The frames output by the frame buffer 106, i.e., the frame used for the motion prediction and the parallax prediction will hereinafter be called prediction source frames.

<Motion/Parallax Vector Compensation Unit>

The motion/parallax vector correcting unit 107 conducts block-matching-based prediction by use of the input frame and the prediction source frame in accordance with the instruction given from the control unit 110. The motion/parallax vector correcting unit 107 outputs the motion vector information and the parallax vector information to the variable length coding unit 108. Further, the motion/parallax vector correcting unit 107 outputs the predictive information to the subtracter 102. The motion vector information, the parallax vector information and the predictive information are used for minimizing the prediction error. Moreover, the motion/parallax vector correcting unit 107 outputs the motion vector information as a whole of the frames to the control unit 110. The motion vector information connotes, e.g., an average and dispersion of the motion vector information in all of the blocks.

<Variable Length Coding Unit>

The variable length coding unit 108 generates the data of the compression-coded frames by variable-length-coding the result of the quantization. Further, the variable length coding unit 108 transfers the motion vector information used for the motion compensation and the parallax vector information employed for the parallax compensation to the header attaching unit 109.

<Header Attaching Unit>

The header attaching unit 109 generates the dynamic image data by attaching items of information such as a camera number, a camera type (the base camera or the reference camera) and other cameras to be referred to on a frame basis or a plural-frame basis after being compression-coded.

<Control Unit>

The control unit 110 controls the coding of the dynamic image captured by each of the cameras, determines the base camera (a base camera determining process) and also determines the frame that is referred to for the predictive coding of the frame captured by the reference camera (a reference destination determining process). Further, the control unit 110 establishes connections enabling the instructions to be given to the respective functional units. Moreover, parameters (layout information about the individual cameras) of the respective cameras are inputted to the control unit 110 from outside. The layout information may be organized by absolute positions of the respective cameras and may also be relative positions thereof. The base camera determining process and the reference destination determining process will hereinafter be described.

Figure 4:
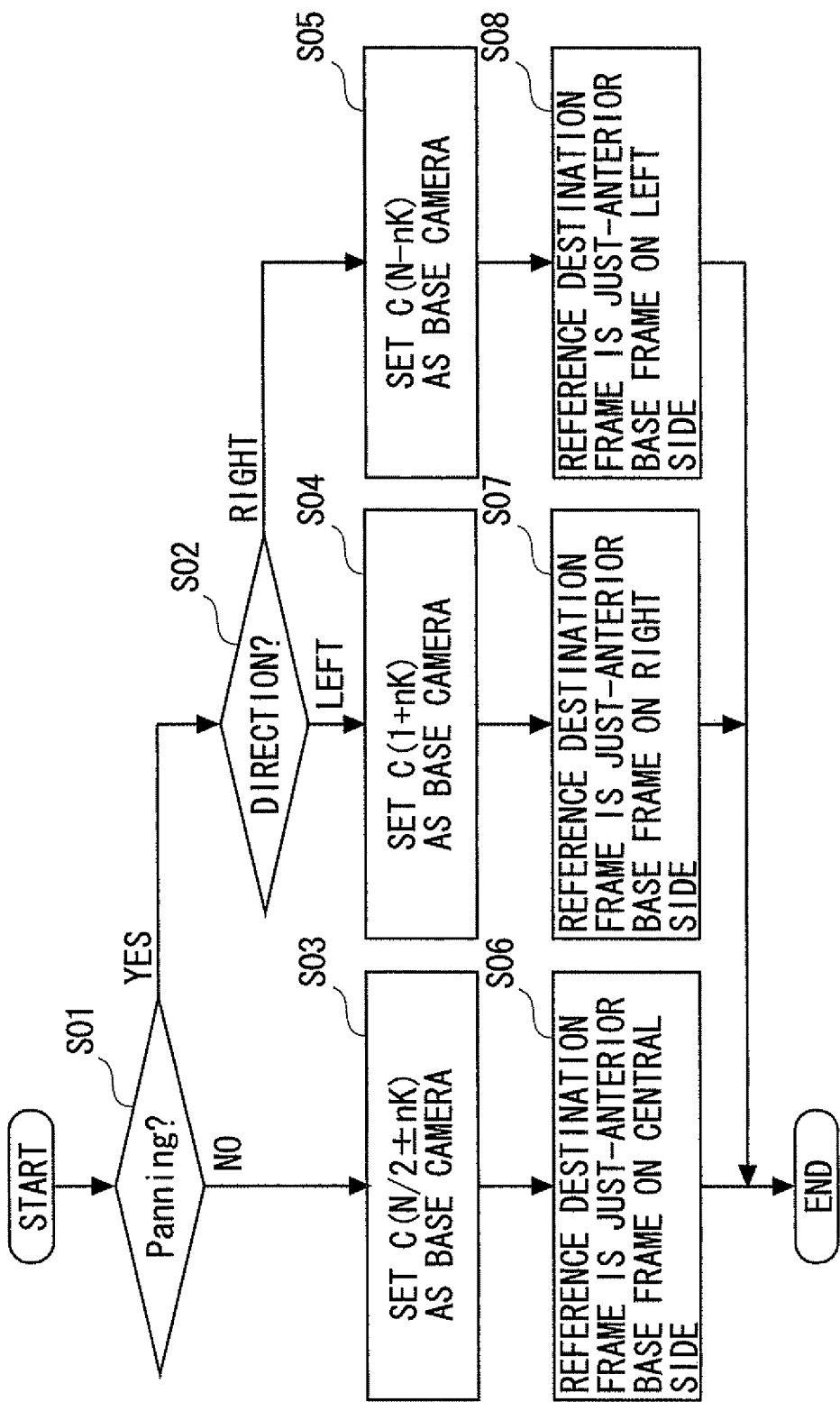
FIG. 4 is a flowchart showing processing examples of a base camera determining process and a reference destination determining process.

FIG. 4 is a flowchart showing an operational example of the control unit 110 in the base camera determining process and the reference destination determining process. The operational example of the control unit 110 will be explained with reference to FIG. 4. Note that the following processes are executed on a type-of-GOPs basis. Namely, the processes in FIG. 4 are executed on the basis of plural GOPs aggregated by one SEQH.

To start with, the control unit 110 determines whether or not panning occurs in the last frame of the just-anterior GOP (S01). The control unit 110 determines, based on the motion vector information (e.g., the average and the dispersion of the motion vector information in all of the blocks) in the last frame of the just-anterior GOP, whether the panning occurs or not. In other words, the occurrence of the panning is determined based on the motion within the captured image (picture) of an object in the last frame. In this case, the control unit 110 determines whether or not an average value of the crosswise motion vectors is equal to or larger than a threshold value, and determines whether or not the dispersion thereof is equal to or larger than a threshold value. If these two conditions are satisfied, the control unit 110 determines that the panning occurs. Whereas if even one of these two conditions is not satisfied, the control unit 110 determines that the panning does not occur.

When determining that none of the panning occurs (S01-No), the control unit 110 calculates "C(N/2±nK)" and sets the camera corresponding to a result of this calculation as the base camera (S03). Note that C (m) stands for an identifier that identifies an m-th camera, and an assumption is that the numerals are assigned to the plurality of cameras arranged in one direction in this arranging sequence. Further, "N" represents a total number of the cameras. Moreover, "n" indicates an integer that is equal to or greater than"0". Still further, a value of"K" is a positive value that is properly set by a designer, corresponding to an interval between the cameras and a distance between the camera and the object. In this case, the camera existing at the center of a train of cameras and the cameras existing at an equal interval (K) in the right-and-left directions, are set as the base cameras.

Figure 5:
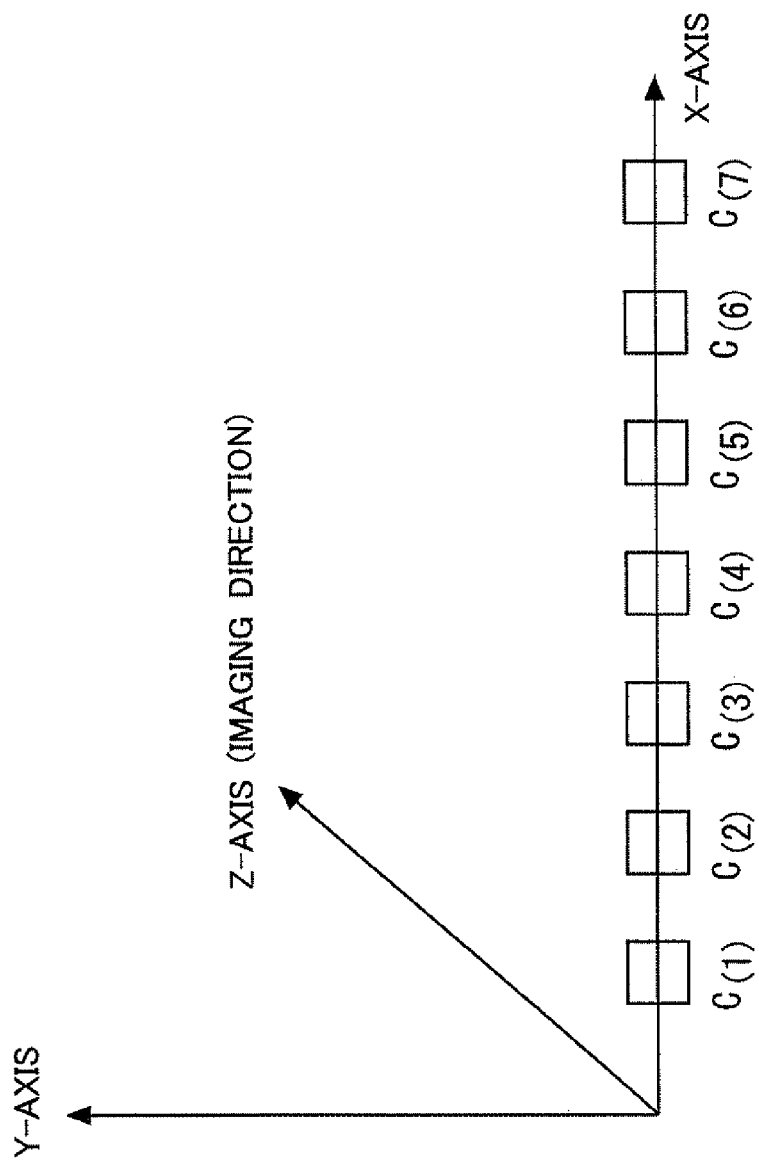
FIG. 5 is a diagram showing an example of how the cameras are arranged.

Then, in the frames included in the processing target GOP, reference destination frame for prediction-coding the frame captured by the reference camera is determined. In this case, the control unit 110 determines the nearest base frame on the central side with respect to each frame as the reference destination frame (S06). FIG. 5 is a diagram showing an example of the arrangement of the cameras. Further, FIG. 6 is a table showing whether each camera becomes the base camera or not and showing, in the case of the reference camera, which base camera the reference destination frame corresponds to. FIG. 5 shows that seven pieces of cameras C(1)-C(7) are arranged in the numerical sequence along the X-axis. FIG. 5 also illustrates that the respective cameras are arranged at equal or arbitrary intervals in a direction vertical to an imaging direction (a Z-axis direction). Further, in FIG. 6, a value of K is set to "2". FIG. 6 also shows that the mark "O" designates the base camera, and C(m) represents that the frame captured by this camera is the reference destination frame. When determining that the panning does not occur, as a result of the process in S03, the cameras C(2), C(4) and C(6) are set as the base cameras. Then, the base camera C(2) is the reference destination to the camera C(1), the base camera C(4) is the reference destination to C(3) and C(5), and the base camera C(6) is the reference destination to C(7).

Next, a case of determining that the panning occurs (S01-Yes) will be explained. In this case, the control unit 110 determines which direction the panning occurs in (S02). This direction can be determined from the motion vector information used when determining the occurrence of the panning. Namely, the direction in which the panning occurs can be determined from this vector direction. The control unit 110, when determining that the panning occurs in the left direction (S02-left), C(1+nK) is set as the base camera (S04). Then, the control unit 110 determines the reference destination frame as the nearest base frame on the right side to each frame captured by the reference camera (S07). In other words, the control unit 110 sets the reference destination frame, to each frame captured by the reference camera, as the frame corresponding to the nearest base camera installed in a direction opposite to the panning-occurred direction.

While on the other hand, the control unit 110, when determining that the panning occurs in the right direction (S02-right), sets C(N−nK) as the base camera (S05). Then, the control unit 110 determines the reference destination frame to each frame captured by the reference camera as the nearest base camera on the left side (S08).

[Decompression-Decoding Device]

Next, an example of a configuration of the decompression-decoding device 2 will be described. The decompression-decoding device 2 is configured by including, as hardware components, a CPU (Central Processing Unit), a main storage device (Random Access Memory: RAM) and an auxiliary storage device, which are connected to each other via a bus. The auxiliary storage device is constructed by employing a nonvolatile memory. The nonvolatile memory connoted herein indicates a so-called ROM (Read-Only Memory) (including an EPROM (Erasable Programmable Read-Only Memory), an EEPROM (Electrically Erasable Programmable Read-Only Memory), a mask ROM, etc), an FRAM (Ferroelectric RAM), a hard disk and so on.

Figure 7:
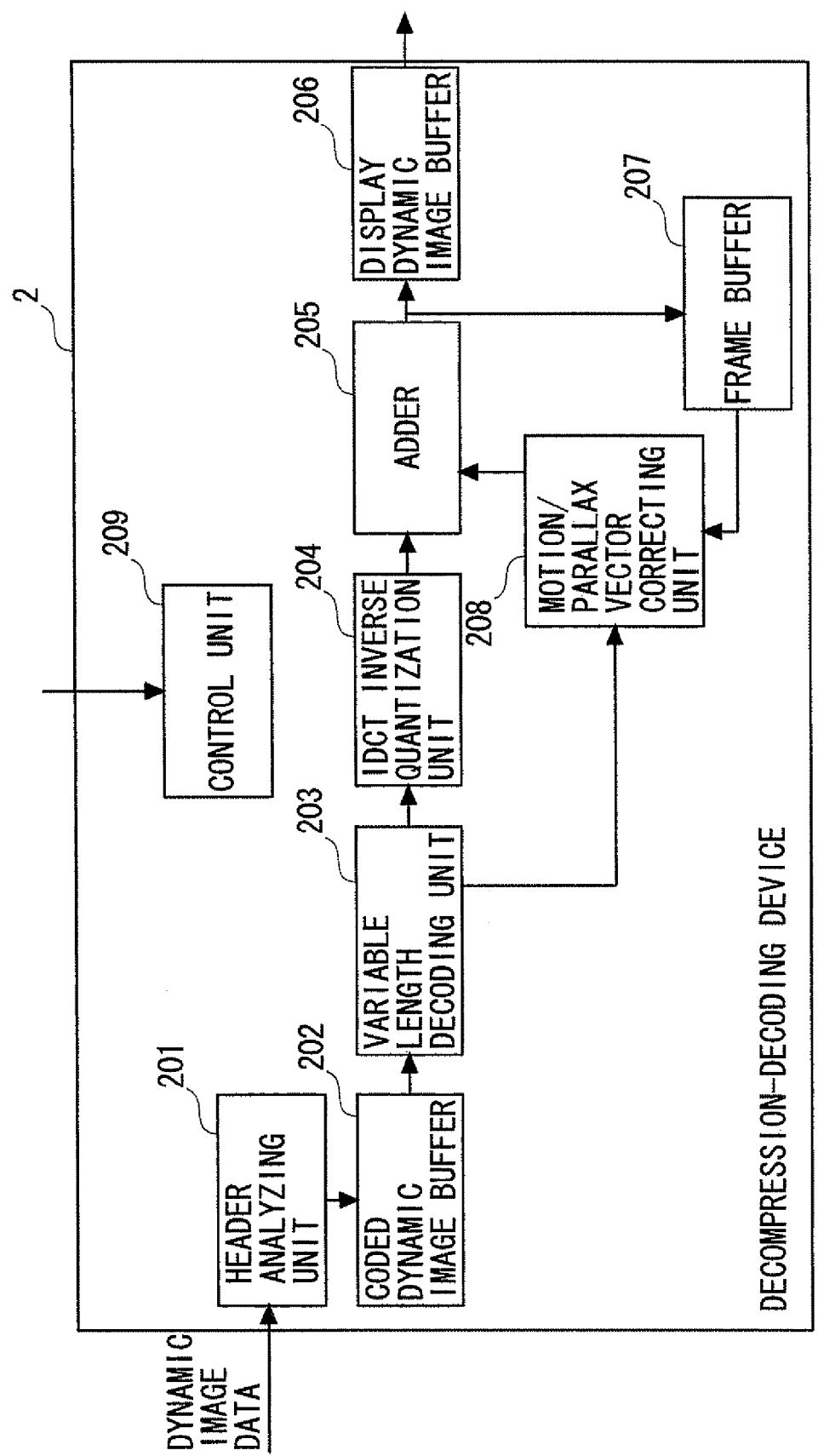
FIG. 7 is a diagram showing an example of functional blocks of a decompression-decoding device.

FIG. 7 is a diagram showing an example of functional blocks of the decompression-decoding device 2. The decompression-decoding device 2 functions, when a variety of programs (OS, applications, etc) stored in the auxiliary storage device are loaded into the main storage device and are executed by the CPU, as a device including a header analyzing unit 201, a coded dynamic image buffer 202, a variable length decoding unit 203, an IDCT inverse quantization unit 204, an adder 205, a display dynamic image buffer 206, a frame buffer 207, a motion/parallax vector correcting unit 208 and a control unit 209. The header analyzing unit 201, the variable length decoding unit 203, the IDCT inverse quantization unit 204, the motion/parallax vector correcting unit 208 and the control unit 209 are actualized by executing the programs with the CPU. Further, the header analyzing unit 201. th variable length decoding unit 203, the IDCT inverse quantization unit 204, the motion/parallax vector correcting unit 208 and the control unit 209 may also be configured as dedicated chips. Next, the respective functional units included in the decompression-decoding device 2 will be described.

<Header Analyzing Unit>

The header analyzing unit 201 extracts the header information from the inputted dynamic image data (the dynamic image data generated by the compression-coding device 1). Items of header information are, to be specific, an identifier and a type of the camera (the base camera or the reference camera) that captures each frame, and an identifier of the camera capturing the reference destination frame. Further, the header analyzing unit 201 receives the identifier of the camera capturing the should-be-decoded frame from the control unit 209. Then, the header analyzing unit 201 determines based on this identifier whether each of the inputted frames should be decoded or not, and transfers only the frame determined as the should-be-decoded frame to the coded dynamic image buffer 202. Specifically, the header analyzing unit 201 determines the GOP corresponding to a should-decode-target camera in the GOPs containing the frames captured by the respective cameras (a decoding target camera determining process). The execution of this process enables omission of the decoding process about unnecessary frames, and the processing can be speeded up. Simultaneously, a should-do-buffering data size can be also reduced, and, for example, the display dynamic image buffer 206 and the frame buffer 207 can be downsized. Moreover, the header analyzing unit 201 notifies the control unit 209 of the identifier of the frame transferred to the coded dynamic image buffer 202.

Figure 8:
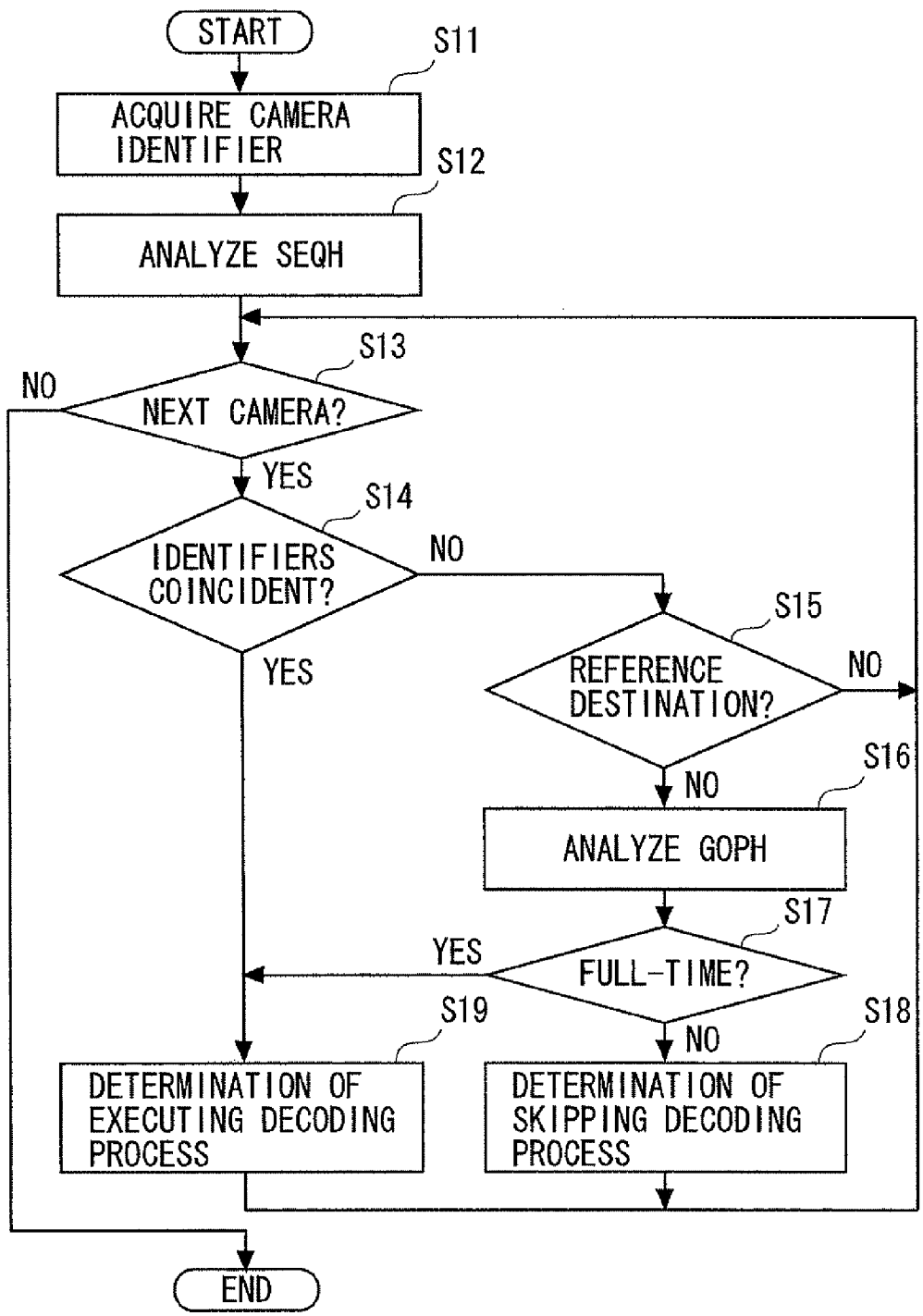
FIG. 8 is a flowchart showing a processing example of a decoding camera determining process.
Figure 9:
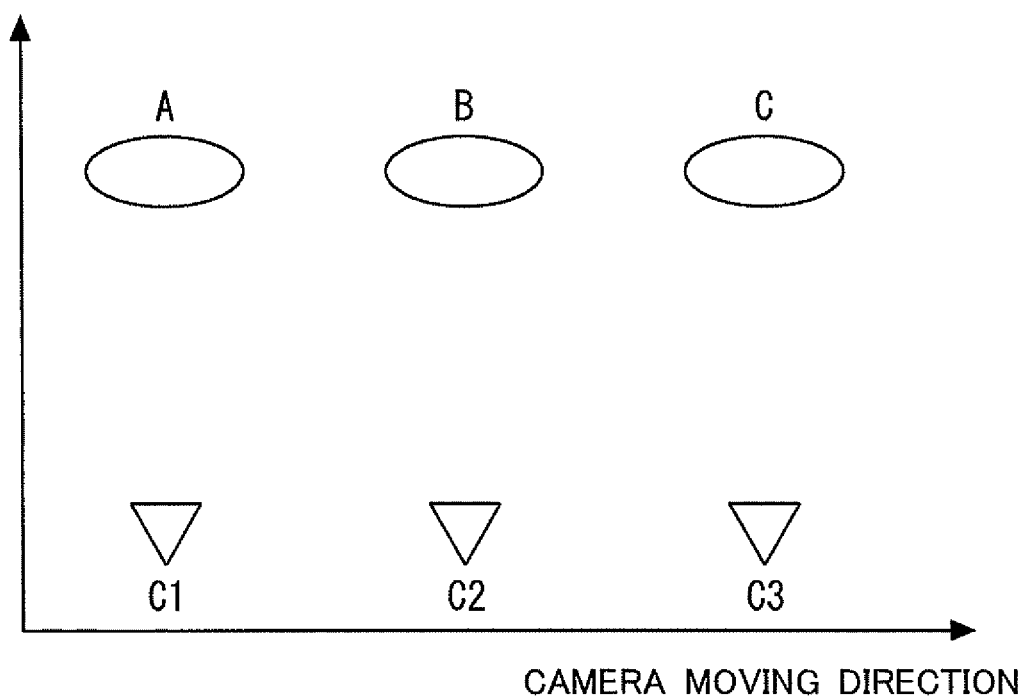
FIG. 9 is a diagram illustrating a problem of the prior art.

The decoding target camera determining process will hereinafter be described. Note that an assumption of the following description is that the image captured by the reference camera will have been compression-coded by use of only the frame captured by the base camera as the reference destination frame. The assumption is not, however, necessarily thus limited. FIG. 8 is a flowchart showing an operational example of the header analyzing unit 201 in the decoding target camera determining process. The process shown in this flowchart is executed each time the SEQH is detected. To begin with, the header analyzing unit 201 acquires the camera identifier from the control unit 209 (S11). Next, the header analyzing unit 201 extracts the SEQH from the dynamic image data to be inputted and analyzes the SEQH (S12). Through this analysis, the header analyzing unit 201 acquires an error prediction type of each camera and the identifier of the reference destination camera.

Next, the header analyzing unit 201 searches for the GOPH (GOP Header). At this time, if the next SEQH is detected, i.e., if there is no frame captured by the next camera, this process is terminated (S13-No). Whereas if the GOPH is detected (S13-Yes), the header analyzing unit 201 analyzes this GOPH, thereby acquiring the camera identifier. Then, the header analyzing unit 201 determines whether or not the identifier contained in the GOPH is coincident with the identifier transferred from the control unit 209. If coincident with each other (S14-Yes), the header analyzing unit 201 determines that the decoding of each of the frames contained in this GOP should be executed (S19). Then, the processes from S13 onward are again executed.

While on the other hand, the header analyzing unit 201, if the identifiers are not coincident with each other (S14-No), determines whether or not the camera is a camera corresponding to the reference destination of the camera specified by the identifier transferred from the control unit 209. If not the reference destination (S15-No), the processes from S13 onward are executed. Whereas if determined to be the reference destination (S15-Yes), the header analyzing unit 201 analyzes the GOPH, thus analyzing a period of time during which the parallax prediction is not performed (S16). Then, if the parallax prediction is performed in full-time (S17-Yes), it is determined that the decoding of each of the frames contained in this GOP should be executed (S19). Whereas if the parallax prediction is not conducted for some period of time (S17-No), the header analyzing unit 201 decides the frame undergoing the parallax prediction, and determines that only this frame should be decoded (S18). Then, the processes from S13 onward are again executed.

<Coded Dynamic Image Buffer>

The coded dynamic image buffer 202 buffers the respective frames determined as the should-be-decoded frames by the header analyzing unit 201. The coded dynamic image buffer 202 outputs the frames on a decoding process basis according to an instruction given from the control unit 209. The "decoding process basis" may be a 1-frame basis and may also be a plural-frame basis as in the case of the GOP.

<Variable Length Decoding Unit>

The variable length decoding unit 203 variable-length-decodes the variable-length-coded quantized DCT coefficient, and transfers a decoded result to the IDCT inverse quantization unit 204. Further, the variable length decoding unit 203 variable-length-decodes also the motion vector information and the parallax vector information, and transfers a decoded result to the motion/parallax vector correcting unit 208.

<IDCT Inverse Quantization unit>

The IDCT inverse quantization unit 204 performs the IDCT operation and the inverse quantizing operation. The IDCT inverse quantization unit 204 inversely quantizes the quantized DCT coefficient and performs the inverse DCT operation, thereby acquiring a result of the inverse DCT operation.

<Adder>

The adder 205 generates the decoded dynamic image by adding up the result of the inverse DCT operation and the result of the prediction based on the motion compensation and the parallax compensation.

<Display Dynamic Image Buffer>

The display dynamic image buffer 206 buffers the data of the decoded dynamic image generated by the adder 205. At this time, the display dynamic image buffer 206 buffers the data of the decoded dynamic image corresponding to the camera designated to display from outside. Then, the display dynamic image buffer 206 sequentially outputs the data undergoing the buffering.

<Frame Buffer>

The frame buffer 207 buffers the data of the decoded dynamic image in the same way as by the display dynamic image buffer 206. Further, the frame buffer 207 accumulates, irrespective of the designation given from outside, the frames captured by other cameras, which are needed for decoding the processing target frame.

<Motion/Parallax Vector Correcting Unit>

The motion/parallax vector correcting unit 208 reads, based on the instruction given from the control unit 209, the frames employed for the motion prediction and the parallax prediction, which are required for decoding the processing target frame, from the frame buffer 207. Then, the motion/parallax vector correcting unit 208 acquires the motion vector information/parallax vector information from the variable length decoding unit 203. Then, the motion/parallax vector correcting unit 208 acquires and transfers a predicted result to the adder 205.

<Control Unit>

The control unit 209 conducts the decoding control about the dynamic image data to be inputted. Further, the control unit 209 establishes connections enabling the instructions to be given to the respective functional units. Moreover, the control unit 209 receives an input of the identifier specifying the camera capturing the dynamic image that should be output to outside from the display dynamic image buffer 206. The identifier may be the singular or the plural. Then, the control unit 209 transfers the inputted identifier to the header analyzing unit 201.

[Operation/Effect]

MODIFIED EXAMPLE

The respective frames (the I'-frame, the P'-frame and the B'-frame) captured by the reference camera may be prediction-coded by referring to the frames captured by another reference camera without being limited to the frames captured at the same time by the base camera, and may also be prediction-coded by referring to the frames captured at different points of time by the base camera and another reference camera.

Further, the cameras are not necessarily arranged along the straight line but may be arranged in any form such as a wavy line, a circle, a cross and a square.

[Industrial Applicability]

The present invention can acquire the effects when applied to the device that codes and decodes the images captured at the multi-points of view.

<Incorporation by Reference>

The disclosures of international application PCT/JP2005/000123 filed on Jan. 7, 2005 including the specification, drawings and abstract are incorporated herein by reference.

What is claimed is:

1. A decompression-decoding device for decompression-decoding dynamic image data including motion predictive information generated by a compression-coding device compression-coding respective frames captured by a plurality of cameras, comprising:

instruction input unit accepting an instruction about the frames that should be output;

determining unit reading the motion predictive information to determine the frames used for motion prediction from the dynamic image data, and determining the frames used for motion prediction in compression-coding the should-be-output frames based on the motion predictive information;

buffering unit buffering the frames determined by said determining unit; and decompression-decoding unit executing decompression-decoding about only the frames determined by said determining unit in the buffering unit and the should-be-output frames.

2. A decompression-decoding device according to claim 1, wherein the motion predictive information further comprises information of time when each of the frames is compression-coded without implementing the motion prediction using the frames captured by another camera, and said determining unit, when determining the frames used for the motion prediction in compression-coding the should-be-output frames, determines the camera deemed to capture the frames used for the motion prediction in compression-coding the should-be-output frames, and determines, as the frames used for the motion prediction, the frames excluding the frames corresponding to the information of the time when the should-be-output frames are compression-coded without implementing the motion prediction in the frames captured by the camera.

3. A decompression-decoding method of decompression-decoding dynamic image data including motion predictive information generated by compression-coding respective frames captured by a plurality of cameras, comprising:

accepting an instruction about the frames that should be output;

reading the motion predictive information to determine the frames used for motion prediction from the dynamic image data, and determining the frames used for motion prediction in compression-coding the should-be-output frames based on the motion predictive information;

buffering the frames determined in said determining; and executing decompression-decoding about only the frames determined in said determining in the buffering and the should-be-output frames.

4. A decompression-decoding method according to claim 3, wherein the motion predictive information further comprises information of time when each of the frames is compression-coded without implementing the motion prediction using the frames captured by another camera, and wherein the determining further comprises determining the camera deemed to capture the frames used for the motion prediction in compression-coding the should-be-output frames, and determining, as the frames used for the motion prediction, the frames excluding the frames corresponding to the information of the time when the should-be-output frames are compression-coded without implementing the motion prediction in the frames captured by the camera.

5. A non-transitory computer-readable medium recorded with a program for making an information processing device execute decompression-decoding of dynamic image data including motion predictive information generated by compression-coding respective frames captured by a plurality of cameras, comprising:

accepting an instruction about the frames that should be output;

reading the motion predictive information to determine the frames used for motion prediction from the dynamic image data, and determining the frames used for motion prediction in compression-coding the should-be-output frames based on the motion predictive information;

buffering the frames determined in said determining; and executing decompression-decoding about only the frames determined in said determining in the buffering and the should-be-output frames.

6. A non-transitory computer-readable medium recorded with a program according to claim 5, wherein the motion predictive information further comprises information of time when each of the frames is compression-coded without implementing the motion prediction using the frames captured by another camera, and wherein the determining further comprises determining the camera deemed to capture the frames used for the motion prediction in compression-coding the should-be-output frames, and determining, as the frames used for the motion prediction, the frames excluding the frames corresponding to the information of the time when the should-be-output frames are compression-coded without implementing the motion prediction in the frames captured by the camera.

* * * * *